United States Patent
Matsui et al.

(10) Patent No.: US 9,672,979 B2
(45) Date of Patent: Jun. 6, 2017

(54) POWER TRANSMITTING APPARATUS, POWER TRANSMISSION SYSTEM, AND POWER TRANSMISSION METHOD

(71) Applicant: FUJITSU LIMITED, Kawasaki-shi, Kanagawa (JP)

(72) Inventors: Kiyoto Matsui, Miki (JP); Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 400 days.

(21) Appl. No.: 14/444,816

(22) Filed: Jul. 28, 2014

(65) Prior Publication Data

US 2014/0333151 A1    Nov. 13, 2014

Related U.S. Application Data

(63) Continuation of application No. PCT/JP2012/052185, filed on Jan. 31, 2012.

(51) Int. Cl.
| | |
|---|---|
| *H01F 38/14* | (2006.01) |
| *H02J 7/02* | (2016.01) |
| *H04B 5/00* | (2006.01) |
| *H02J 5/00* | (2016.01) |

(52) U.S. Cl.
CPC .............. *H01F 38/14* (2013.01); *H02J 5/005* (2013.01); *H02J 7/025* (2013.01); *H04B 5/0037* (2013.01)

(58) Field of Classification Search
CPC  H02J 17/00; H02J 5/005; H01F 38/14; H01F 38/14; B60L 11/182; G06Q 50/06
USPC .......................................... 307/104; 320/108
See application file for complete search history.

(56) References Cited

U.S. PATENT DOCUMENTS

| 8,405,486 B2 | 3/2013 | Yamada et al. | |
|---|---|---|---|
| 2009/0072629 A1* | 3/2009 | Cook | H02J 17/00 307/104 |
| 2010/0148939 A1* | 6/2010 | Yamada | H01Q 7/00 340/10.34 |
| 2010/0187913 A1* | 7/2010 | Smith | H04B 5/0081 307/104 |
| 2011/0169338 A1* | 7/2011 | Kozakai | H02J 5/005 307/104 |

(Continued)

FOREIGN PATENT DOCUMENTS

| JP | 2008-283791 | 11/2008 |
|---|---|---|
| JP | 2010-148174 | 7/2010 |

(Continued)

OTHER PUBLICATIONS

International Search Report of Int. Appl. No. PCT/JP2012/052185 dated May 1, 2012.

*Primary Examiner* — Jared Fureman
*Assistant Examiner* — Win Htun
(74) *Attorney, Agent, or Firm* — Fujitsu Patent Center

(57) ABSTRACT

A power transmitting apparatus includes a power transmission or reception circuit, a first coil connected to the power transmission or reception circuit through wires, a plurality of resonance coils having respective, different diameters one of which is selectively coupled to the first coil through electromagnetic induction, and a position control apparatus configured to control the positions of the resonance coils, wherein the position control apparatus is configured to selectively align an axial direction of one of the resonance coils with an axial direction of the first coil.

8 Claims, 14 Drawing Sheets

(56) References Cited

U.S. PATENT DOCUMENTS

| | | | | |
|---|---|---|---|---|
| 2011/0175457 A1* | 7/2011 | Komiyama | ............ | H02J 5/005 307/104 |
| 2011/0241440 A1* | 10/2011 | Sakoda | .................. | H02J 5/005 307/104 |
| 2012/0025761 A1* | 2/2012 | Takada | .................... | H02J 5/005 320/108 |
| 2012/0098330 A1* | 4/2012 | Ichikawa | ............. | B60L 11/123 307/9.1 |
| 2012/0223588 A1* | 9/2012 | Suzuki | .................... | H02J 5/005 307/104 |
| 2013/0026850 A1* | 1/2013 | Throngnumchai | ... | B60L 11/182 307/104 |
| 2013/0038281 A1* | 2/2013 | Sakakibara | ............. | B60L 5/005 320/108 |
| 2013/0169057 A1* | 7/2013 | Jung | ....................... | H02J 5/005 307/104 |
| 2014/0225454 A1* | 8/2014 | Ichikawa | ............. | B60L 11/182 307/104 |
| 2014/0300316 A1* | 10/2014 | Miwa | .................... | G06Q 30/04 320/108 |

FOREIGN PATENT DOCUMENTS

| | | |
|---|---|---|
| WO | 2011-074082 | 6/2011 |
| WO | 2011-135722 | 11/2011 |

* cited by examiner

POWER TRANSMITTING APPARATUS, POWER TRANSMISSION SYSTEM, AND POWER TRANSMISSION METHOD

CROSS-REFERENCE TO RELATED APPLICATIONS

This application is a continuation application of International Application PCT/JP2012/052185 filed on Jan. 31, 2012 and designated the U.S., the entire contents of which are incorporated herein by reference.

FIELD

The disclosures herein generally relate to power supply systems, and particularly relate to a wireless power supply system that wirelessly supplies electric power.

BACKGROUND

Wireless power transmission technology that transmits electric power between two points in space without use of a power transmission cable includes a magnetic resonance power transmission technology that uses magnetic resonance to transmit power. In the magnetic resonance power transmission system, a coil (i.e., LC resonance coil) having a resonance function based on capacitor and inductor is provided on each of the transmission side and the reception side. The LC resonance coil provided on the transmission side and the LC resonance coil provided on the reception side have a common resonance frequency. Electric power is transmitted from the transmission side to the reception side via a high-frequency alternating-current magnetic field that oscillates at this resonance frequency.

The magnetic resonance power transmission system allows longer distance between the power transmitting coil and the power receiving coil (i.e., longer distance in the direction perpendicular to the coil plane) and a wider margin for the position of a power receiving side (i.e., greater tolerance to a displacement in the direction parallel to the coil plane) than the wireless power transmission system that uses electromagnetic induction without utilizing resonance. Further, highly efficient power transmission is achieved between coils having different sizes.

In general, a resonance coil having a relatively small diameter provides a relatively high transmission efficiency in a relatively short distance, but its transmission efficiency degrades in a relatively long distance. On the other hand, a resonance coil having a relatively large diameter provides a relatively high transmission efficiency in a relatively long distance, but its transmission efficiency degrades in a relatively short distance. With the distance between the power transmitting apparatus and the power receiving apparatus being constant, optimum resonance coils for such a distance can be designed. When the distance between the transmission side and the reception side is not constant, however, power transmission efficiency may degrade depending on the displacement from the optimum distance.

[Patent Document 1] Japanese Laid-open Patent Publication No. 2008-283791

[Patent Document 2] Japanese Laid-open Patent Publication No. 2010-148174

SUMMARY

According to an aspect of the embodiment, a power transmitting apparatus includes a power transmission or reception circuit, a first coil connected to the power transmission or reception circuit through wires, a plurality of resonance coils having respective, different diameters one of which is selectively coupled to the first coil through electromagnetic induction, and a position control apparatus configured to control the positions of the resonance coils, wherein the position control apparatus is configured to selectively align an axial direction of one of the resonance coils with an axial direction of the first coil.

According to an aspect of the embodiment, a power transmission system includes a power transmitting apparatus and a power receiving apparatus configured to receive power from the power transmitting apparatus via magnetic resonance, wherein at least one of the power transmitting apparatus and the power receiving apparatus includes a power transmission or reception circuit, a first coil connected to the power transmission or reception circuit through wires, a plurality of resonance coils having respective, different diameters one of which is selectively coupled to the first coil through electromagnetic induction, and a position control apparatus configured to control the positions of the resonance coils, wherein the position control apparatus is configured to selectively align an axial direction of one of the resonance coils with an axial direction of the first coil.

According to an aspect of the embodiment, a power transmission method includes selecting one of a plurality of resonance coils having respective, different diameters, aligning an axial direction of the selected one of the resonance coils with an axial direction of a first coil, placing an axial direction of each of one or more resonance coils other than the selected one of the resonance coils in a direction perpendicular to the axial direction of the first coil, supplying alternating-current power to the first coil through wire connections, supplying alternating-current power from the first coil to the selected one of the resonance coils through electromagnetic induction, and transmitting power from the selected one of the resonance coils to a resonance coil on a receiver side through magnetic resonance.

According to an aspect of the embodiment, a power transmission method includes selecting one of a plurality of resonance coils having respective, different diameters, aligning an axial direction of the selected one of the resonance coils with an axial direction of a coupling coil, placing an axial direction of each of one or more resonance coils other than the selected one of the resonance coils in a direction perpendicular to the axial direction of the coupling coil, supplying alternating-current power from the selected one of the resonance coils to the coupling coil through electromagnetic induction, and transmitting power from a resonance coil on a transmitter side to the selected one of the resonance coils on a receiver side through magnetic resonance.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings. In these drawings, the same or corresponding elements are referred to by the same or corresponding numerals, and a description thereof will be omitted as appropriate.

Figure 1:
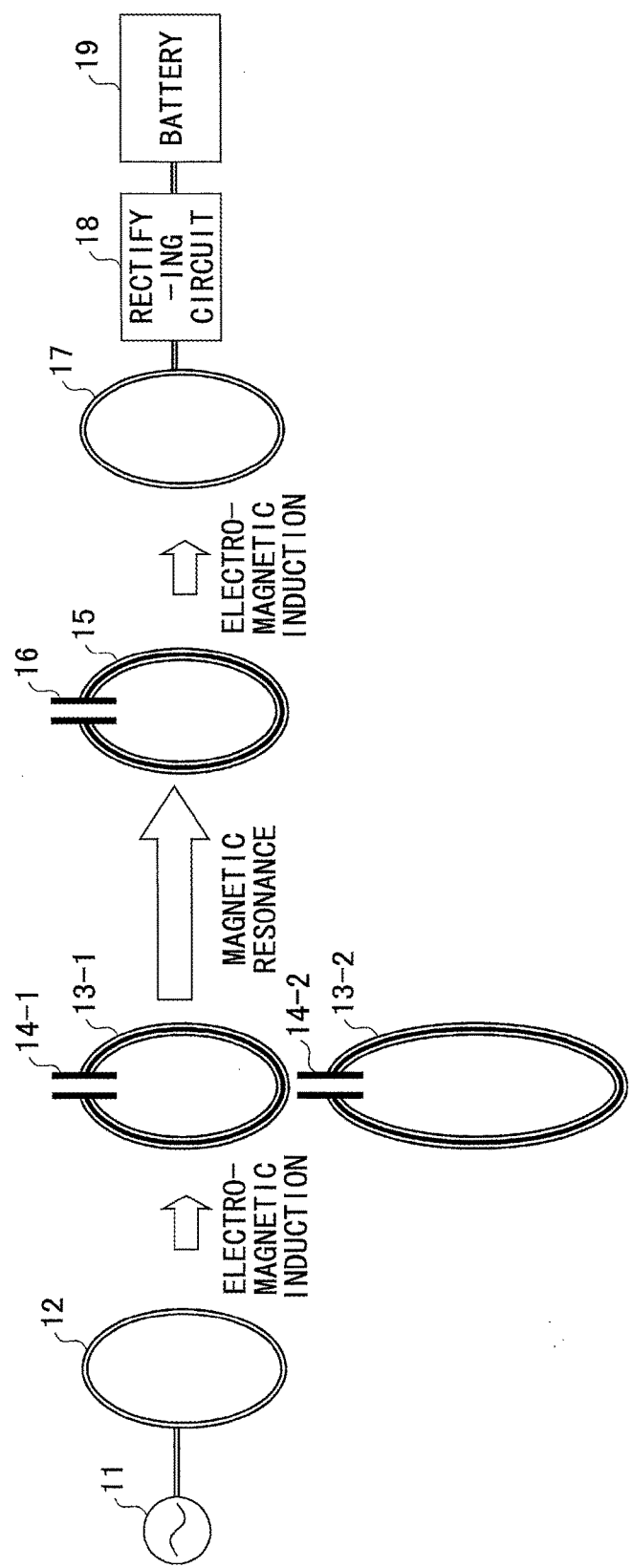
FIG. 1 is a drawing illustrating an example of the configuration of a magnetic resonance power transmission system.

FIG. 1 is a drawing illustrating an example of the configuration of a magnetic resonance power transmission system. A power transmission system 10 illustrated in FIG. 1 includes an oscillating circuit 11, a coil 12, resonance coils 13-1 and 13-2, capacitors 14-1 and 14-2, a resonance coil 15, a capacitor 16, a coil 17, a rectifying circuit 18, and a battery 19. The oscillating circuit 11, the coil 12, the resonance coils 13-1 and 13-2, and the capacitors 14-1 and 14-2 correspond to a power transmitter. The resonance coil 15, the capacitor 16, the coil 17, the rectifying circuit 18, and the battery 19 correspond to a power receiver. In a power transmission system 10 in which the power receiver receives power from the power transmitter via magnetic resonance, at least one of the power transmitter and the power receiver may include a plurality of resonance coils. As one example, the power transmission system 10 illustrated in FIG. 1 has a configuration in which the plurality of resonance coils 13-1 and 13-2 are provided on the power transmitter side. The power transmission system 10 is not limited to this configuration. The power transmission system 10 may have a plurality of resonance coils on the power receiver side, or may have a plurality of resonance coils both on the power transmitter side and on the power receiver side. Further, the number of resonance coils provided in such a manner is not limited to two. Three or more resonance coils may be provided.

The oscillating circuit 11 oscillates at desired oscillating frequency. The coil 12 is connected through wires to the oscillating circuit 11 serving as a power transmission circuit. The oscillating circuit 11 supplies alternating-current power having the above-noted oscillating frequency to the coil 12 via wire connections. The coil 12 is selectively coupled via electromagnetic induction to one of the resonance coils 13-1 and 13-2 having respective, different diameters, and supplies power to the coupled resonance coil The resonance coil 13-1 is coupled to the capacitor 14-1, so that the resonance coil 13-1 and the capacitor 14-1 serve as a resonance circuit. Similarly, the resonance coil 13-2 is coupled to the capacitor 14-2, so that the resonance coil 13-2 and the capacitor 14-2 serve as a resonance circuit. Moreover, the resonance coil 15 is coupled to the capacitor 16, so that the resonance coil 15 and the capacitor 16 serve as a resonance circuit. These resonance circuits may have common resonance frequency. The oscillating circuit 11 may supply alternating-current power having this resonance frequency to the coil 12. In the example illustrated in FIG. 1, each capacitor coupled to a coil is illustrated as a condenser (i.e., capacitor element), but is not limited to such a configuration. Each capacitor may be the stray capacitance of a corresponding coil. The number of windings of each coil is not limited to a particular number. The number of windings of each coil may be one, or may be more than one. Each coil may be a helical coil or a spiral coil As will be described later, however, each coil may preferably be confined in a substantially flat plane (i.e., be a planar coil). Namely, in the case of a helical coil having a plurality of windings, it is preferable for the length of the coil along the axis thereof to be substantially shorter than the diameter of the coil.

Electric current flowing through the resonance coil 13-1 oscillates at the resonance frequency. This causes, through magnetic coupling, electric current oscillating at the resonance frequency to appear in the resonance coil 15 having the same resonance frequency. Both the resonance circuit including the resonance coil 13-1 and the resonance circuit including the resonance coil 15 oscillate, so that large electric current flows through these resonance circuits, thereby effecting efficient power transmission from the power transmission side to the power reception side. Namely, power is transmitted through magnetic resonance from the resonance coil 13-1 to the resonance coil 15.

The coil 15 is coupled with the resonance coil 17 via electromagnetic induction to supply alternating-current power to the coil 17. The coil 17 is connected through wires to the rectifying circuit 18 serving as a power receiving circuit. The coil 17 supplies alternating-current power to the rectifying circuit 18 via wire connections. The rectifying circuit 18 generates a direct-current voltage by rectifying the alternating-current power, and applies the direct-current voltage to the battery 19 to charge the battery 19.

Figure 2:
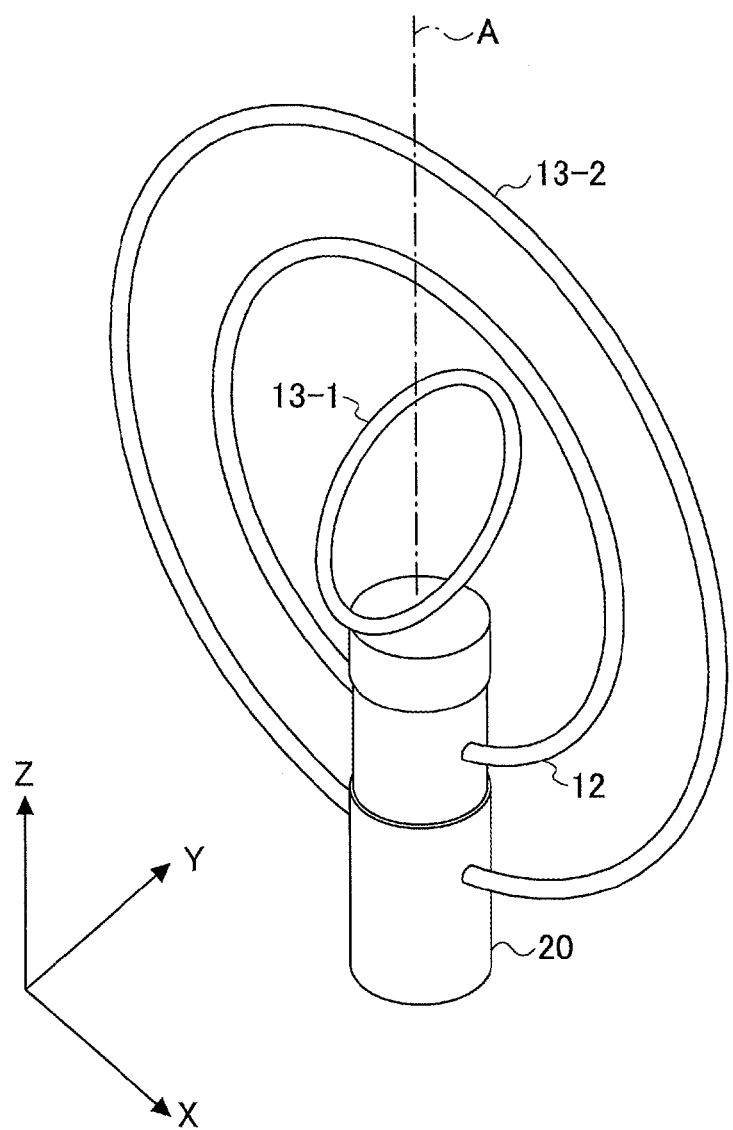
FIG. 2 is an oblique perspective view for explaining the positional control of a coil and resonance coils.

FIG. 2 is an oblique perspective view for explaining the positional control of the coil 12 and the resonance coils 13-1 and 13-2. The coil 12 and the resonance coils 13-1 and 13-2 are fixedly mounted to a position control apparatus 20. The capacitors coupled to the resonance coils 13-1 and 13-2 are omitted from illustration. The position control apparatus 20 may include an embedded motor (e.g., stepping motor) driven by a control circuit, and utilizes the drive force of the motor to rotate the coil 12 or the resonance coils 13-1 and 13-2 around a common rotation axis A. In FIG. 2, the direction of the rotation axis A coincides with the direction of the Z axis.

The position control apparatus 20 controls the positions of the resonance coils 13-1 and 13-2 to selectively align the axial direction of one of the resonance coils 13-1 and 13-2 (i.e., the resonance coil 13-2 in the example illustrated in FIG. 2) with the axial direction of the coil 12. Further, the position control apparatus 20 places the remaining resonance coil (i.e., the resonance coil 13-1 in the example illustrated in FIG. 2) different from the aligned one (i.e., the resonance coil 13-2 in the example illustrated in FIG. 2) of the resonance coils 13-1 and 13-2 such that the axial direction of the remaining resonance coil is perpendicular to the axial direction of the coil 12.

Figure 3:
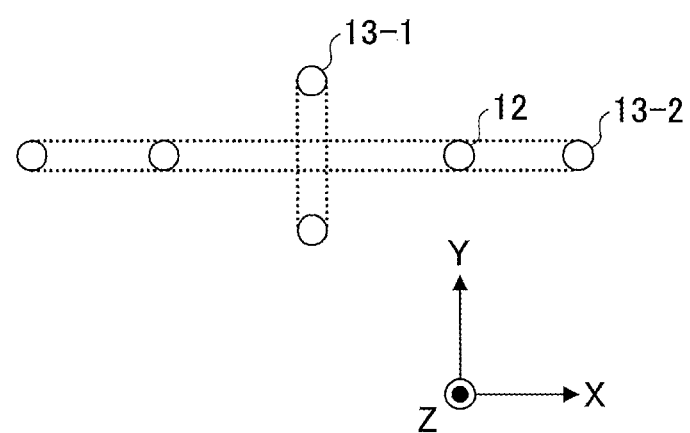
FIG. 3 is a plan view of the coil and the resonance coils illustrated in FIG. 2 as viewed from above (i.e., from the positive Z-axis direction)

FIG. 3 is a plan view of the coil 12 and the resonance coils 13-1 and 13-2 illustrated in FIG. 2 as viewed from above (i.e., from the positive Z-axis direction). In the arrangement illustrated in FIG. 3, the axial directions of the coil 12 and the resonance coil 13-2 coincide with the Y-axis direction, and the axial direction of the resonance coil 13-1 coincide with the X-axis direction.

As was previously described, the number of windings of each coil may be one, or may be more than one. In the case of a helical coil having a plurality of windings, the direction of the axis of the coil is the direction of the center axis of an imaginary or physical cylinder or prism body around which a coil wire is wound, and corresponds to the direction of magnetic flux passing through the coil. In the case of a spiral coil, the direction of the axis of the coil is the direction perpendicular to the plane that includes the spiral, and corresponds to the direction of magnetic flux passing the center of the coil in the plane that includes the coil. In the case of a single-winding coil, the direction of the axis of the coil is the direction perpendicular to the plane that includes the single-winding coil, and corresponds to the direction of magnetic flux passing the center of the coil in the plane that includes the coil. Each coil may be a helical coil. In the case of a helical coil having a substantial length in the axial direction, however, rotating coils as illustrated in FIG. 2 may result in these coils coming in physical contact with each other, and may also result in the coils interfering with magnetic flux. Accordingly, each coil may preferably be confined in a substantially flat plane (i.e., be a planer coil). Namely, in the case of a helical coil having a plurality of windings, it is preferable for the length of the coil along the axial direction thereof to be substantially shorter than the diameter of the coil. In the case of the coil 12 and the resonance coils 13-1 and 13-2 being planer coils, the position control apparatus 20 may selectively place one of the resonance coils 13-1 and 13-2 (i.e., the resonance coil 13-2 in the example illustrated in FIG. 2 and FIG. 3) in the same plane as the coil 12. Further, the position control apparatus 20 may place the remaining resonance coil (i.e., the resonance coil 13-1 in the example illustrated in FIG. 2 and FIG. 3) other than the aligned one of the resonance coils 13-1 and 13-2 in the plane perpendicular to the coil 12.

In the example illustrated in FIG. 2 and FIG. 3, each coil rotates around a common rotation axis. This is not a limiting example, and the rotation axis of each coil does not have to be the same. However, the rotation axes of the resonance coils may preferably be situated around a midpoint along the width of the coil 12 in the direction parallel to the coil 12 (i.e., the X direction in FIG. 3). The direction vertical to the coil 12 (i.e., the Y direction in FIG. 3) does not matter.

As in the example of arrangement illustrated in FIG. 2 and FIG. 3, the alignment of the axial directions of the coil 12 and the resonance coil 13-2 with each other ensures that the magnetic flux passing through the coil 12 passes through the resonance coil 13-2, resulting in these coils being coupled to each other through electromagnetic induction. Namely, provision of alternating-current power to the coil 12 results in electric power being transmitted from the coil 12 to the resonance coil 13-2. Further, the fact that the axial directions of the coil 12 and the resonance coil 13-1 are perpendicular to each other ensures that the magnetic flux passing through the coil 12 does not pass through the resonance coil 13-1. There is thus no coupling between these coils through electromagnetic induction. Namely, provision of alternating-current power to the coil 12 does not result in electric power being transmitted from the coil 12 to the resonance coil 13-1.

Figure 4:
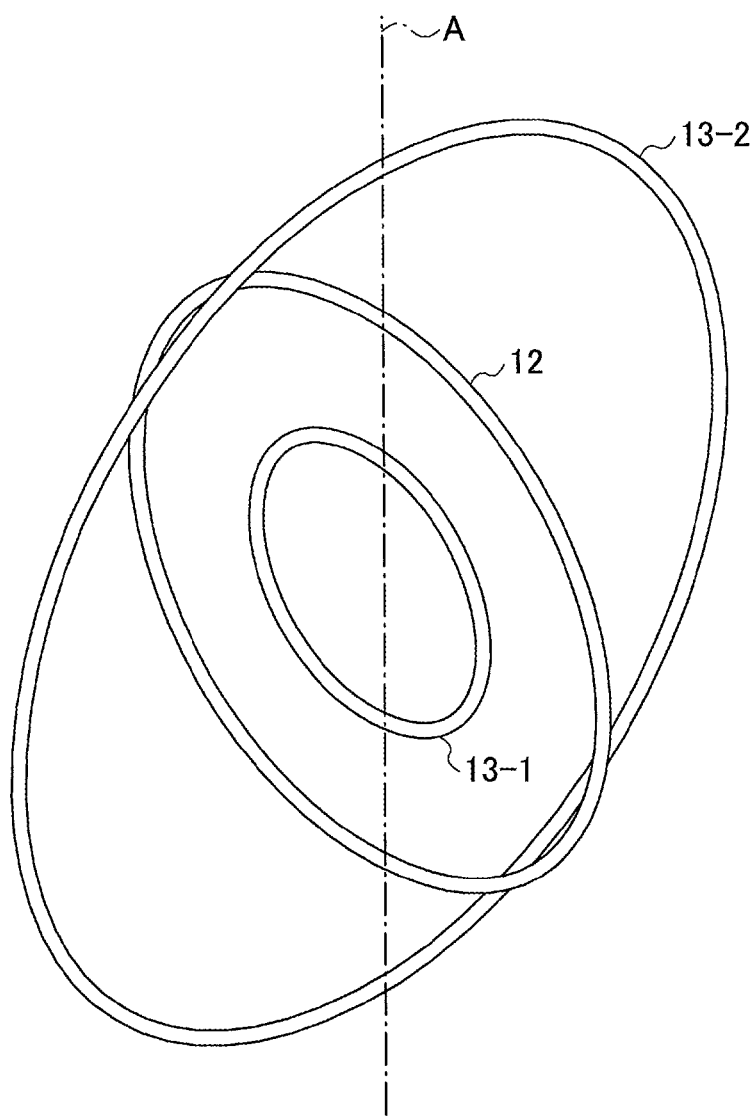
FIG. 4 is an oblique perspective view for explaining another example of arrangement of the coil and the resonance coils.

FIG. 4 is an oblique perspective view for explaining another example of arrangement of the coil 12 and the resonance coils 13-1 and 13-2. In FIG. 4, the illustration of the position control apparatus 20 is omitted, and only the rotation axis A and the positions of coils are illustrated. In the example of arrangement illustrated in FIG. 4, the positions of the resonance coils 13-1 and 13-2 are controlled to selectively align the axial direction of one (i.e., 13-1) of the resonance coils 13-1 and 13-2 with the axial direction of the coil 12. Further, the axial direction of the remaining resonance coil 13-2 other than the above-noted resonance coil 13-1 among the resonance coils 13-1 and 13-2 is situated perpendicularly to the axial direction of the coil 12.

As in the example of arrangement illustrated in FIG. 4, the alignment of the axial directions of the coil 12 and the resonance coil 13-1 with each other ensures that the magnetic flux passing through the coil 12 passes through the resonance coil 13-1, resulting in these coils being coupled to each other through electromagnetic induction. Namely, provision of alternating-current power to the coil 12 results in electric power being transmitted from the coil 12 to the resonance coil 13-1. Further, the fact that the axial directions of the coil 12 and the resonance coil 13-2 are perpendicular to each other ensures that the magnetic flux passing through the coil 12 does not pass through the resonance coil 13-2. There is thus no coupling between these coils through electromagnetic induction. Namely, provision of alternating-current power to the coil 12 does not result in electric power being transmitted from the coil 12 to the resonance coil 13-2.

In this manner, the coil 12 is selectively coupled via electromagnetic induction to one of the resonance coils 13-1 and 13-2 having respective, different diameters, and supplies power to the coupled resonance coil. Through the resonance coil that is selectively coupled, electric power is transmitted to the resonance coil on the power receiver side through magnetic resonance.

Figure 5:
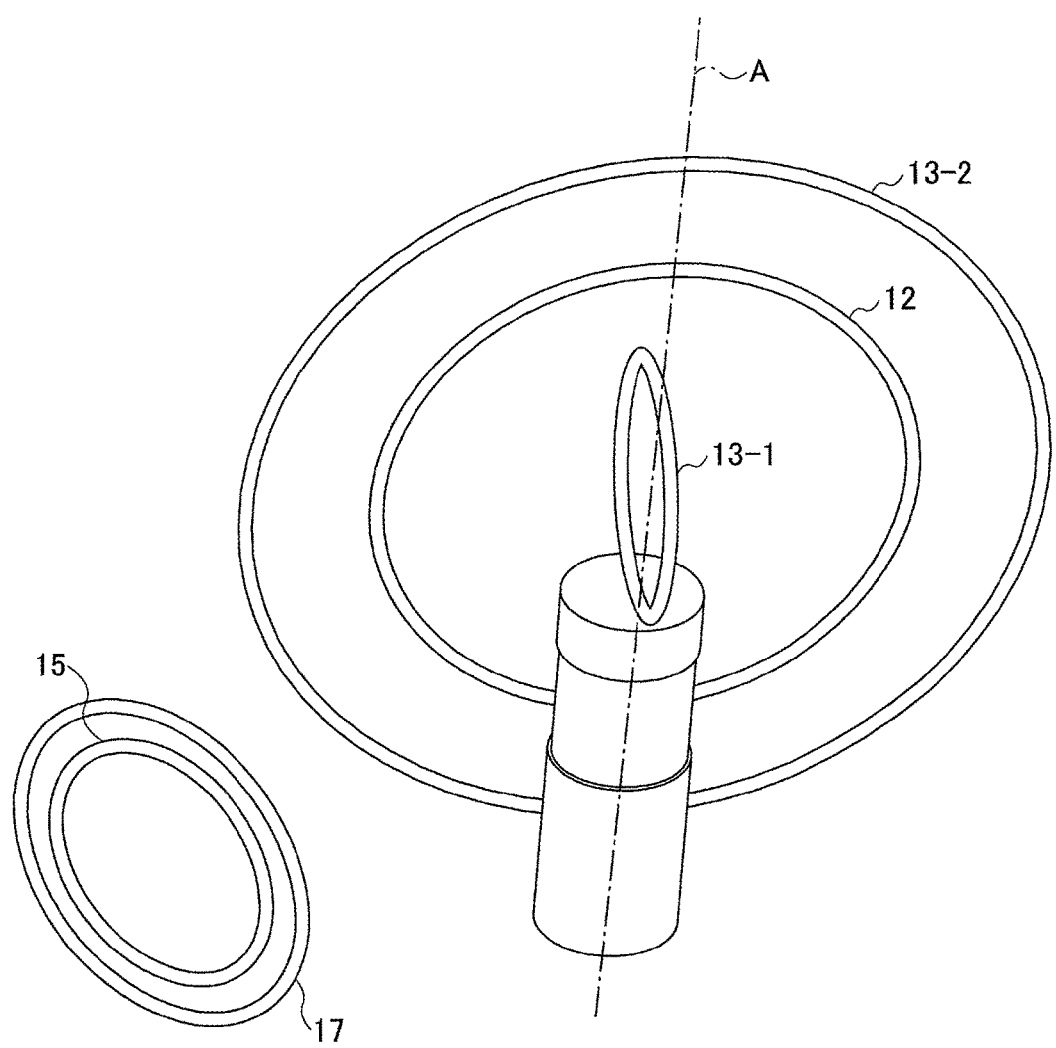
FIG. 5 is a drawing illustrating coils on the power transmitter side and coils on the power receiver side.

FIG. 5 is a drawing illustrating coils on the power transmitter side and coils on the power receiver side. In the example illustrated in FIG. 5, coils on the power transmitter side are arranged such that the axial direction of the coil 12 is aligned with the axial direction of the resonance coil 13-2, and is perpendicular to the axial direction of the resonance coil 13-1. The resonance coil 15 and the coil 17 on the power receiver side are disposed at some distance from the coils on the power transmitter side. The resonance coil 15 and the coil 17 may have the axial directions thereof aligned with each other as illustrated. In the case of both the resonance coil 15 and the coil 17 having a shape confined in a flat plane, the resonance coil 15 and the coil 17 may be situated in the same plane as illustrated. With such an arrangement of coils on the power transmitter side and the power receiver side, the coil 12 on the power transmitter side is selectively coupled through electromagnetic induction to one of the resonance coils 13-1 and 13-2, so that electric power is transmitted from the selectively coupled resonance coil on the power transmitter side to the resonance coil 15 on the power receiver side through magnetic resonance. Power is then transmitted from the resonance coil 15 on the power receiver side to the coil 17 on the power receiver side, and, then, is transmitted from the coil 17 to the power reception circuit (i.e., the rectifying circuit 18 illustrated in FIG. 1).

In this manner, one of a plurality of resonance coils having respective, different diameters is selectively used to effect magnetic-resonance-based power transmission. With this arrangement, a resonance coil having a suitable diameter is selected in response to the distance between the power transmitter and the power receiver, thereby achieving highly efficient power transmission. A coil diameter for achieving high transmission efficiency varies depending on the distance between the power transmitter and the power receiver. Selecting a resonance coil having a suitable diameter achieves satisfactory power transmission efficiency regardless of the distance between the power transmitter and the power receiver.

Figure 6:
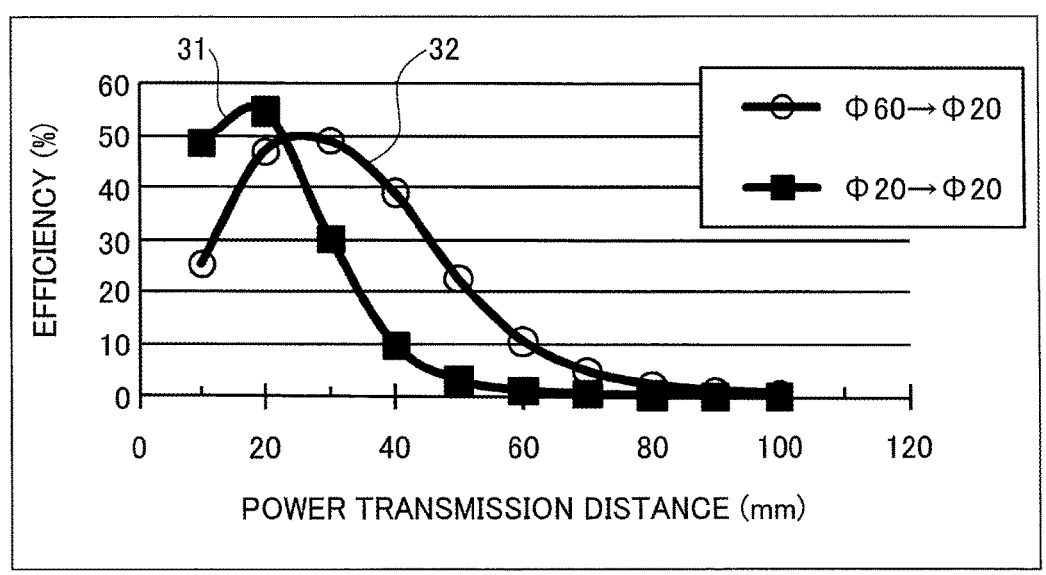
FIG. 6 is a drawing illustrating relationships between transmission distance and power transmission efficiency.

FIG. 6 is a drawing illustrating relationships between transmission distance and power transmission efficiency. The power transmission efficiency illustrated in FIG. 6 is obtained by computer simulation. The conditions used in the computer simulation are as follows. The coil 12 is a single-winding coil in which a wire having a diameter of 1 mm forms a one-turn loop with a diameter of 26 mm. The resonance coil 13-1 is a three-turn coil in which a wire having a diameter of 2 mm forms a three-turn loop with an outer diameter of 20 mm and with 3-mm turn spacing. The resonance coil 13-2 is a single-winding coil in which a wire having a diameter of 1 mm forms a one-turn loop with a diameter of 60 mm. The resonance coil 15-1 is a three-turn coil in which a wire having a diameter of 2 mm forms a three-turn loop with an outer diameter of 20 mm and with 3-mm turn spacing. The coil 17 is a single-winding coil in which a wire having a diameter of 1 mm forms a one-turn loop with a diameter of 26 mm. The resonance frequency is 2 MHz. The transmission distance is the distance between the center of the resonance coil 13-1 or 13-2 and the center of the resonance coil 15.

In the relationships between transmission distance and power transmission efficiency illustrated in FIG. 6, power transmission from the resonance coil 13-1 having a diameter of 20 mm to the resonance coil 15 having a diameter of 20 mm has relatively-high power transmission efficiency in relatively short distances as illustrated by a characteristics curve 31. Power transmission from the resonance coil 13-2 having a diameter of 60 mm to the resonance coil 15 having a diameter of 20 mm has relatively-high power transmission efficiency in relatively long distances as illustrated by a characteristics curve 32. Accordingly, it is preferable to select a suitable one of the resonance coils 13-1 and 13-2 in response to the distance of power transmission for use in magnetic-resonance-based power transmission. Namely, the resonance coil 13-1 may be selected for use in magnetic-resonance-based power transmission when the transmission distance is relatively short. The resonance coil 13-2 may be selected for use in magnetic-resonance-based power transmission when the transmission distance is relatively long.

Figure 7:
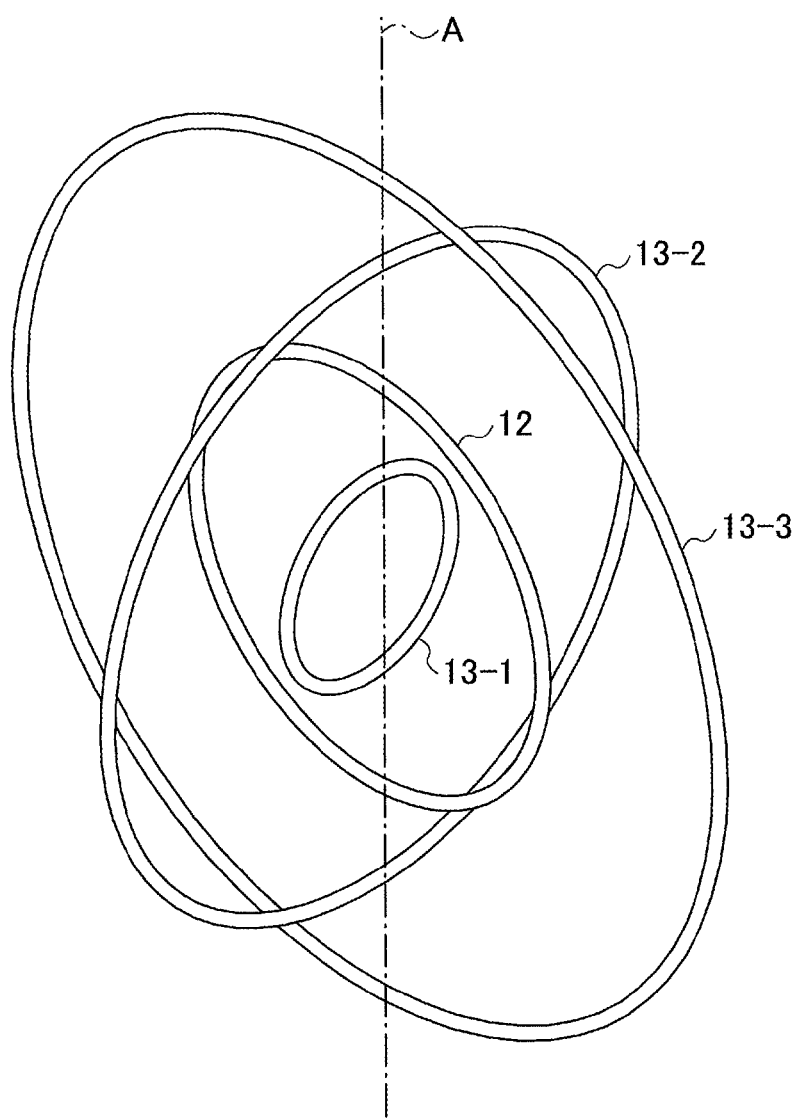
FIG. 7 is a drawing illustrating an example of the configuration having three resonance coils on a power-transmitter side.

FIG. 7 is a drawing illustrating an example of the configuration having three resonance coils on a power-transmitter side. In the example illustrated in FIG. 7, a resonance coil 13-3 having a larger diameter than the resonance coil 13-2 is provided in addition to the coil 12 and the resonance coils 13-1 and 13-2. The resonance coils 13-1 through 13-3 may be rotatable independently of each other around the rotation axis A.

In this manner, three resonance coils having respective, different diameters may be provided. With this arrangement also, one resonance coil may be selected in response to the distance between the power transmitter and the power receiver to effect magnetic-resonance-based power transmission, thereby achieving highly efficient power transmission. A coil diameter for achieving high transmission efficiency varies depending on the distance between the power transmitter and the power receiver. Selecting a resonance coil having a suitable diameter achieves satisfactory power transmission efficiency regardless of the distance between the power transmitter and the power receiver.

Figure 8:
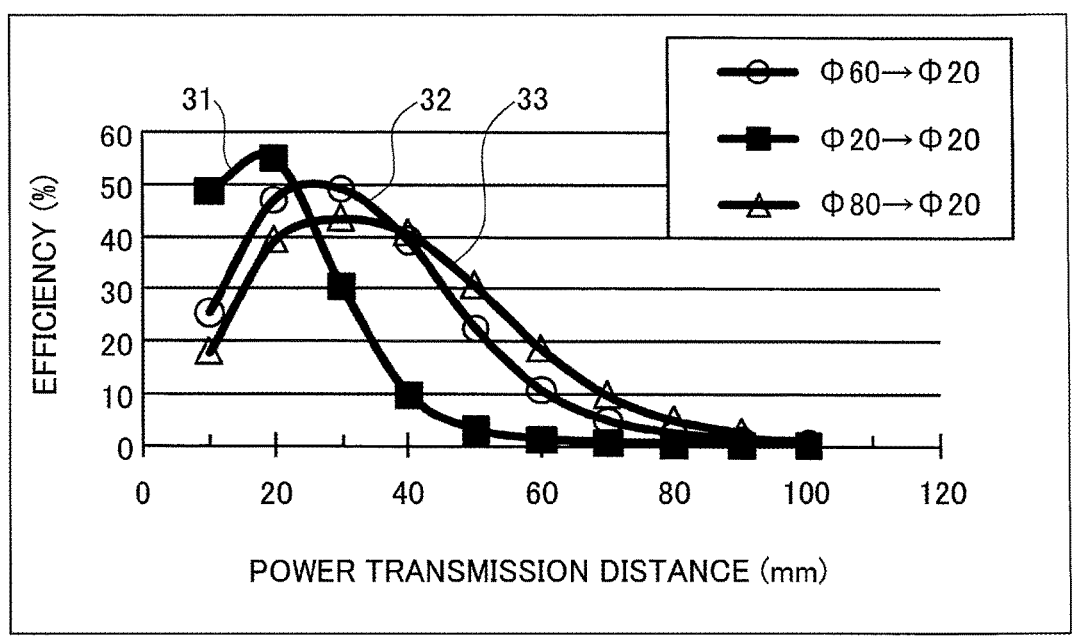
FIG. 8 is a drawing illustrating relationships between transmission distance and power transmission efficiency.

FIG. 8 is a drawing illustrating relationships between transmission distance and power transmission efficiency. Power transmission efficiency illustrated in FIG. 8 is calculated by computer simulation similar to the one performed in connection with FIG. 6. The conditions used in the computer simulation are the same as those used in connection with FIG. 6, and further include conditions regarding the resonance coil 13-3. The resonance coil 13-3 is a single-winding coil in which a wire having a diameter of 2 mm forms a one-turn loop with a diameter of 80 mm.

In the relationships between transmission distance and power transmission efficiency illustrated in FIG. 8, power transmission from the resonance coil 13-1 having a diameter of 20 mm to the resonance coil 15 having a diameter of 20 mm has relatively-high power transmission efficiency in relatively short distances as illustrated by a characteristics curve 31. Power transmission from the resonance coil 13-2 having a diameter of 60 mm to the resonance coil 15 having a diameter of 20 mm has relatively-high power transmission efficiency in middle distances as illustrated by a characteristics curve 32. Power transmission from the resonance coil 13-3 having a diameter of 80 mm to the resonance coil 15 having a diameter of 20 mm has relatively-high power transmission efficiency in relatively long distances as illustrated by a characteristics curve 33. Accordingly, it is preferable to select a suitable one of the resonance coils 13-1 through 13-3 in response to the distance of power transmission for use in magnetic-resonance-based power transmission. Namely, the resonance coil 13-1 may be selected for use in magnetic-resonance-based power transmission when the transmission distance is relatively short. The resonance coil 13-2 may be selected for use in magnetic-resonance-based power transmission when the transmission distance is in a middle range. The resonance coil 13-3 may be selected for use in magnetic-resonance-based power transmission when the transmission distance is relatively long.

Figure 9:
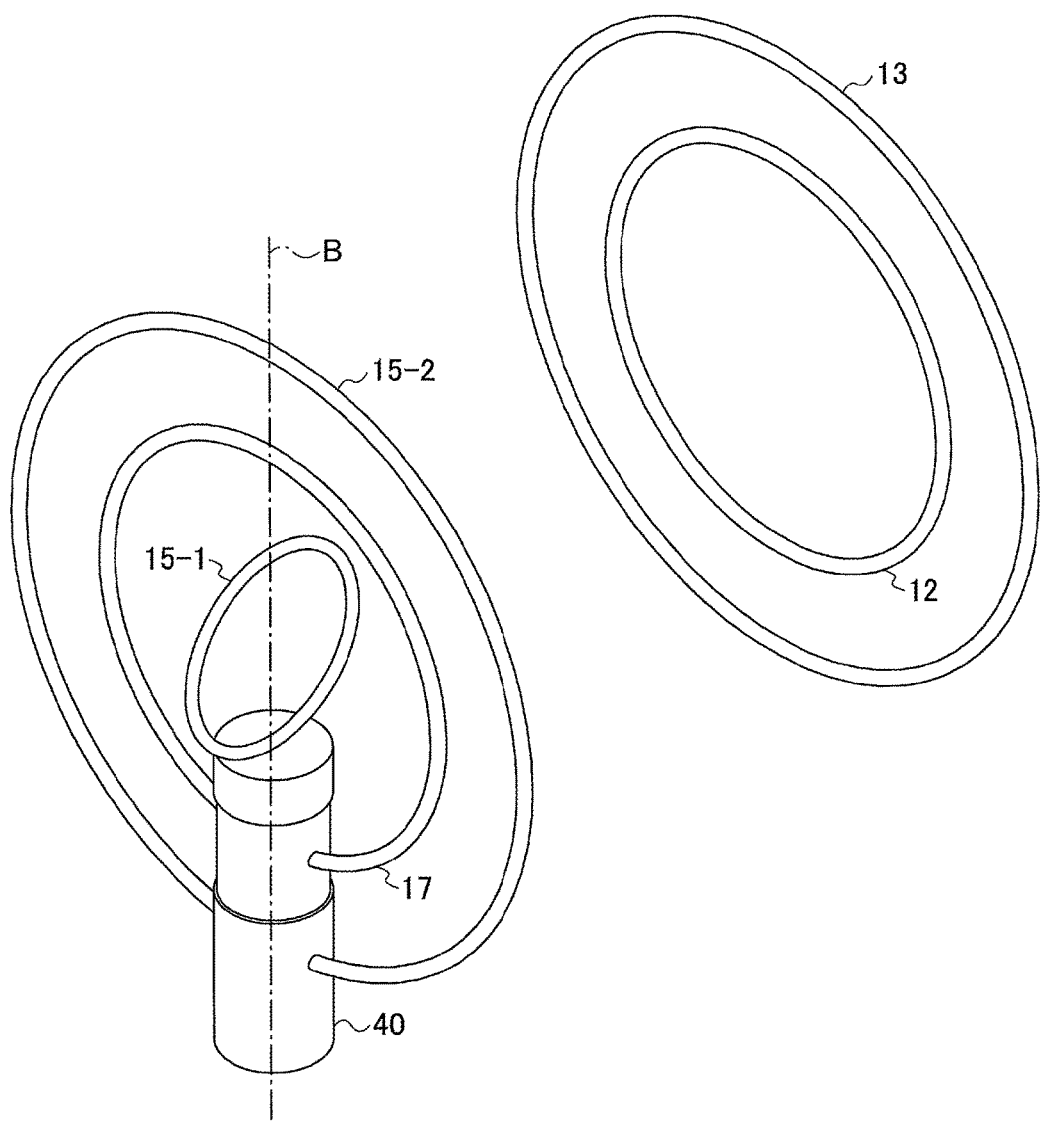
FIG. 9 is a drawing illustrating coils on the power-transmission side and coils on the power reception side when a plurality of resonance coils are provided on the power reception side.

FIG. 9 is a drawing illustrating coils on the power-transmission side and coils on the power reception side when a plurality of resonance coils are provided on the power reception side. In this example, the power transmission side has the coil 12 and one resonance coil 13. The power reception side has the coil 17 and two resonance coils 15-1 and 15-2. The resonance coil 12 and the resonance coil 13 may have the axial directions thereof aligned with each other as illustrated. In the case of both the coil 12 and the resonance coil 13 having a shape confined in a flat plane, the coil 12 and the resonance coil 13 may be situated in the same plane as illustrated.

The coil 17 and the resonance coils 15-1 and 15-2 are fixedly mounted to the position control apparatus 40. The position control apparatus 40 may include an embedded motor (e.g., stepping motor) driven by a control circuit, and utilizes the drive force of the motor to rotate the coil 17 or the resonance coils 15-1 and 15-2 around a common rotation axis B. The position control apparatus 40 controls the positions of the resonance coils 15-1 and 15-2 to selectively align the axial direction of one of the resonance coils 15-1 and 15-2 (i.e., the resonance coil 15-2 in the example illustrated in FIG. 9) with the axial direction of the coil 17. Further, the position control apparatus 40 places the remaining resonance coil (i.e., the resonance coil 15-1 in the example illustrated in FIG. 9) different from the aligned one (i.e., the resonance coil 15-2 in the example illustrated in FIG. 9) of the resonance coils 15-1 and 15-2 such that the axial direction of the remaining resonance coil is perpendicular to the axial direction of the coil 17.

With such a coil arrangement on the power transmission side and on the power reception side, the coil 12 on the power transmission side is coupled through electromagnetic induction to the resonance coil 13, so that power is transmitted from the resonance coil 13 on the power transmission side to the resonance coils 15-1 and 15-2 on the power reception side through magnetic resonance. Further, one of the resonance coils 15-1 and 15-2 on the power reception side is selectively coupled to the coil 17 through electromagnetic induction, thereby transmitting power to the coil 17 on the power reception side. Power is then supplied from the coil to the power reception circuit (i.e., the rectifying circuit 18 illustrated in FIG. 1).

In this manner, one of a plurality of resonance coils having respective, different diameters is selectively used to effect magnetic-resonance-based power transmission. With this arrangement, a resonance coil having a suitable diameter is selected in response to the distance between the power transmitter and the power receiver, thereby achieving highly efficient power transmission. A coil diameter for achieving high transmission efficiency varies depending on the distance between the power transmitter and the power receiver. Selecting a resonance coil having a suitable diameter achieves satisfactory power transmission efficiency regardless of the distance between the power transmitter and the power receiver.

Figure 10:
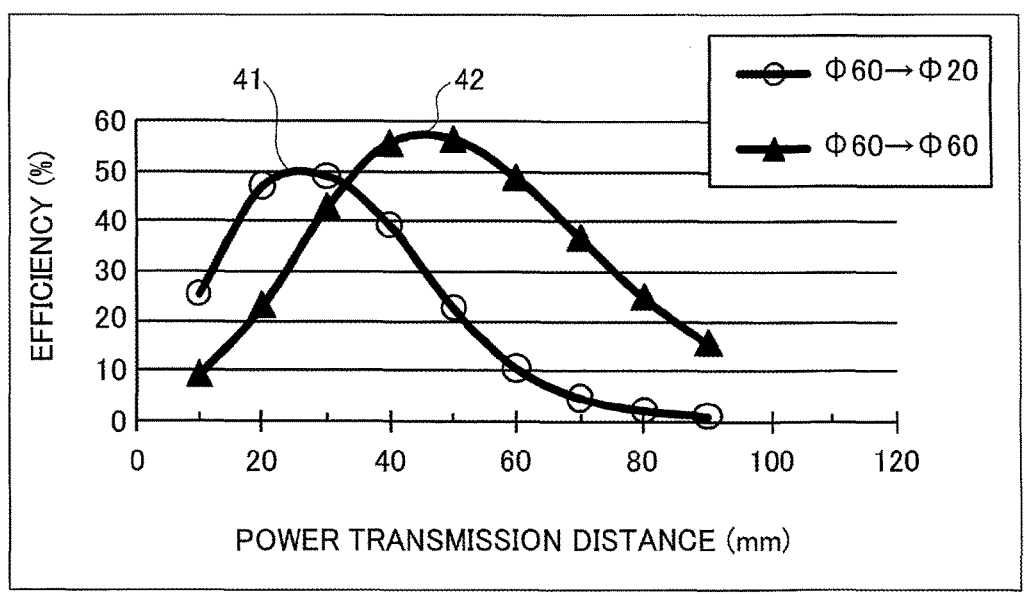
FIG. 10 is a drawing illustrating relationships between transmission distance and power transmission efficiency.

FIG. 10 is a drawing illustrating relationships between transmission distance and power transmission efficiency. The power transmission efficiency illustrated in FIG. 6 is obtained by computer simulation. The conditions used in the computer simulation are as follows. The coil 12 is a single-winding coil in which a wire having a diameter of 1 mm forms a one-turn loop with a diameter of 26 mm. The resonance coil 13 is a single-winding coil in which a wire having a diameter of 1 mm forms a one-turn loop with a diameter of 60 mm. The resonance coil 15-1 is a three-turn coil in which a wire having a diameter of 2 mm forms a three-turn loop with an outer diameter of 20 mm and with 3-mm turn spacing. The resonance coil 15-2 is a three-turn coil in which a wire having a diameter of 1 mm forms a three-turn loop with an outer diameter of 60 mm and with 3-mm turn spacing. The coil 17 is a single-winding coil in which a wire having a diameter of 1 mm forms a one-turn loop with a diameter of 26 mm. The resonance frequency is 2 MHz. The transmission distance is the distance between the center of the resonance coil 13 and the center of the resonance coil 15-1 or 15-2.

In the relationships between transmission distance and power transmission efficiency illustrated in FIG. 10, power transmission from the resonance coil 13 having a diameter of 60 mm to the resonance coil 15-1 having a diameter of 20 mm has relatively-high power transmission efficiency in relatively short distances as illustrated by a characteristics curve 41. Power transmission from the resonance coil 13 having a diameter of 60 mm to the resonance coil 15-2 having a diameter of 60 mm has relatively-high power transmission efficiency in relatively long distances as illustrated by a characteristics curve 42. Accordingly, it is preferable to select a suitable one of the resonance coils 15-1 and 15-2 in response to the distance of power transmission for use in magnetic-resonance-based power transmission. Namely, the resonance coil 15-1 may be selected for use in magnetic-resonance-based power transmission when the transmission distance is relatively short. The resonance coil 15-2 may be selected for use in magnetic-resonance-based power transmission when the transmission distance is relatively long.

Figure 11:
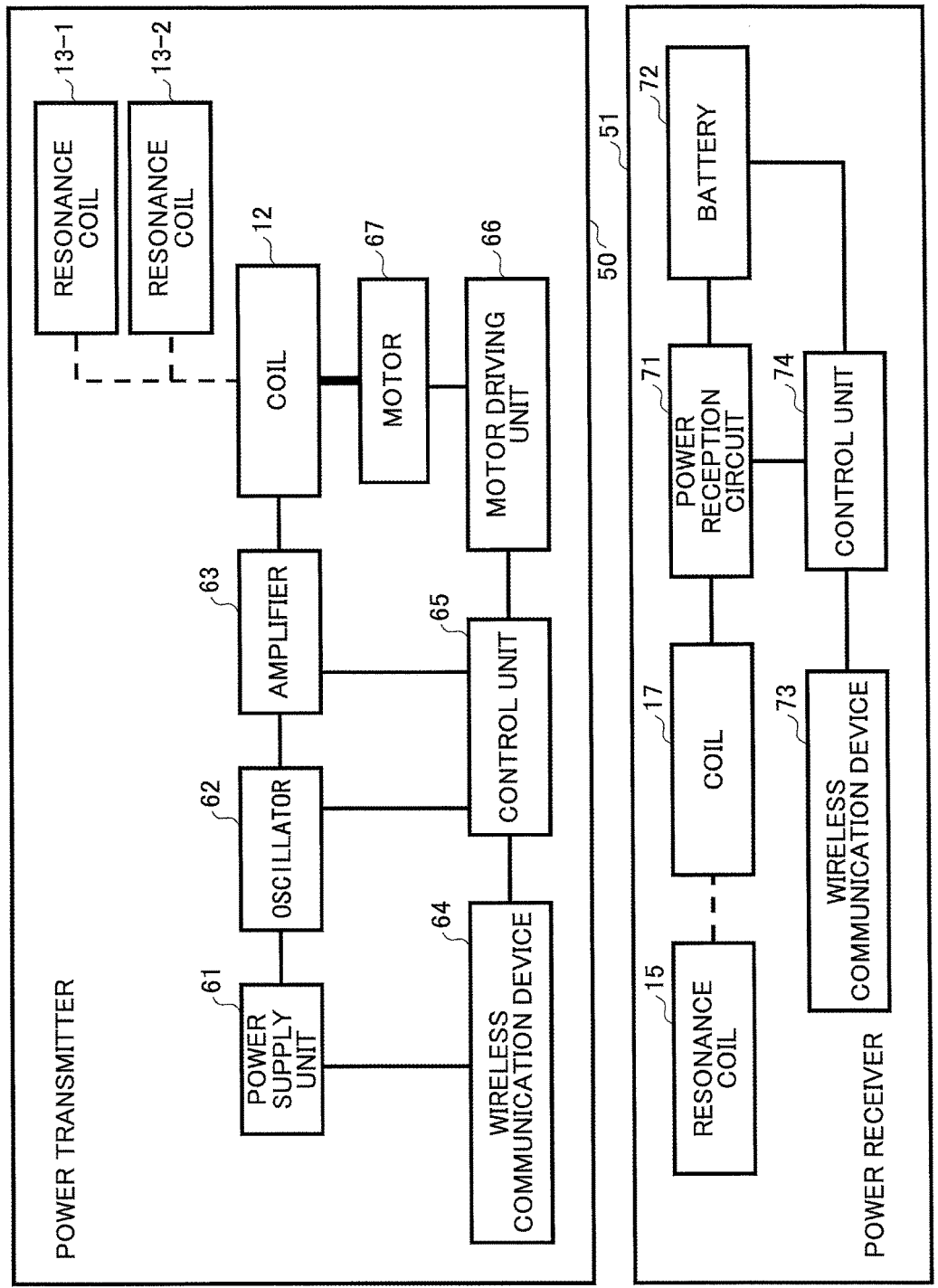
FIG. 11 is a block diagram illustrating an example of the configuration of a power transmitter and a power receiver of a power transmission system in which a plurality of resonance coils are provided on the power transmission side.

FIG. 11 is a block diagram illustrating an example of the configuration of a power transmitter and a power receiver of a power transmission system in which a plurality of resonance coils are provided on the power transmission side. The power transmission system illustrated in FIG. 11 includes a power transmitter 50 and a power receiver 51. The power transmitter 50 includes the coil 12, the resonance coils 13-1 and 13-2, a power supply unit 61, an oscillator 62, an amplifier 63, a wireless communication device 64, a control unit 65, a motor driving unit 66, and a motor 67. The power receiver includes the resonance coil 15, the coil 17, a power reception circuit 71, a battery 72, a wireless communication device 73, and a control unit 74.

The coil 12 and the resonance coils 13-1 and 13-2 correspond to the coil 12 and the resonance coils 13-1 and 13-2, respectively, illustrated in FIG. 1. The oscillator 62 and the amplifier 63 correspond to the oscillating circuit 11 illustrated in FIG. 1. The motor driving unit 66 and the motor 67 correspond to the position control apparatus 20 illustrated in FIG. 2. In FIG. 11, the oscillator 62 oscillates based on the power supply voltage supplied from the power supply unit 61. The amplifier 63 amplifies the oscillating signal. The amplified oscillating signal is supplied as alternating-current power to the coil via wire connections. In the example illustrated in FIG. 11, the angular position of the coil 12 is adjusted by the motor 67 that is driven by the motor driving unit 66. The positions of the resonance coils 13-1 and 13-2 may be fixed. This angular adjustment causes the axial direction of the coil 12 to be aligned with the axial direction of one of the resonance coils 13-1 and 13-2 and also to be orthogonal to the axial direction of the remaining one of the resonance coils 13-1 and 13-2. Alternatively, provision may be made such that the angular positions of the resonance coils 13-1 and 13-2 are adjusted by the motor 67, with the position of the coil 12 being fixed. The control unit 65 controls the motor driving unit 66. The wireless communication device 64 conducts wireless communication through Bluetooth (registered trademark) or the like with the wireless communication device 73 of the power receiver 51. The control unit 65 receives data that the wireless communication device 64 has acquired through wireless communication from the power receiver 51, and controls the motor driving unit 66 based on the received data.

In the power receiver 51, the resonance coil 15 and the coil 17 correspond to the resonance coil 15 and the coil 17 illustrated in FIG. 1, respectively. The power reception circuit 71 corresponds to the rectifying circuit 18 illustrated in FIG. 1. The resonance coil 15 receives power from the resonance coil 13-1 or 13-2 of the power transmitter 50, and then transmits the received power to the coil 17 through electromagnetic induction. The power reception circuit 71 receives alternating-current power from the coil 17 through wire connections, and converts the alternating-current power into direct-current power for provision to the battery 72. With this arrangement, the battery 72 is charged. The power reception circuit 71 detects the amount of received power, and informs the control unit 74 of the detected value of received power amount. The control unit 74 controls the wireless communication device 73 to transmit, from the wireless communication device 73, data indicative of the detected value of received power amount. The battery 72 monitors the battery level of the battery. Upon completion of charge, the battery 72 sends a notice indicative of completion of charge to the control unit 74. The control unit 74 controls the wireless communication device 73 to transmit, from the wireless communication device 73, data indicative of completion of charge.

The control unit 65 of the power transmitter 50 controls the motor driving unit 66 in response to the data indicative of the detected value of received power amount as such data is received through the wireless communication device 64 from the wireless communication device 73 of the power receiver 51. Through this control, a suitable one of the resonance coils 13-1 and 13-2 is selected in response to the detected amount of received power. Namely, a suitable resonance coil is selected in response to the distance between the power transmitter 50 and the power receiver 51. Further, the control unit 65 stops the oscillating operation of the oscillator 62 in response to the data indicative of completion of charge that is received through the wireless communication device 64 from the wireless communication device 73 of the power receiver 51. Through this control, transmission of alternating-current power is terminated upon the completion of battery charging.

Further, the control unit 65 continues or suspends the oscillating operation of the oscillator 62 in response to the data indicative of the detected value of received power amount that is received through the wireless communication device 64 from the wireless communication device 73 of the power receiver 51. In the case where the data indicative of the detected value of received power amount indicates zero received power amount for the duration of more than a predetermined time length, the oscillating operation of the oscillator 62 may be suspended to terminate the transmission of alternating-current power. Further, the control unit 65 may stop the oscillating operation of the oscillator 62 upon receiving no data for the duration of more than a predetermined time length from the wireless communication device 73 of the power receiver 51. Through such control, the oscillating operation of the oscillator 62 may be suspended to terminate the needless transmission of alternating-current power when the power receiver 51 is placed outside the range of power transmission.

Figure 12:
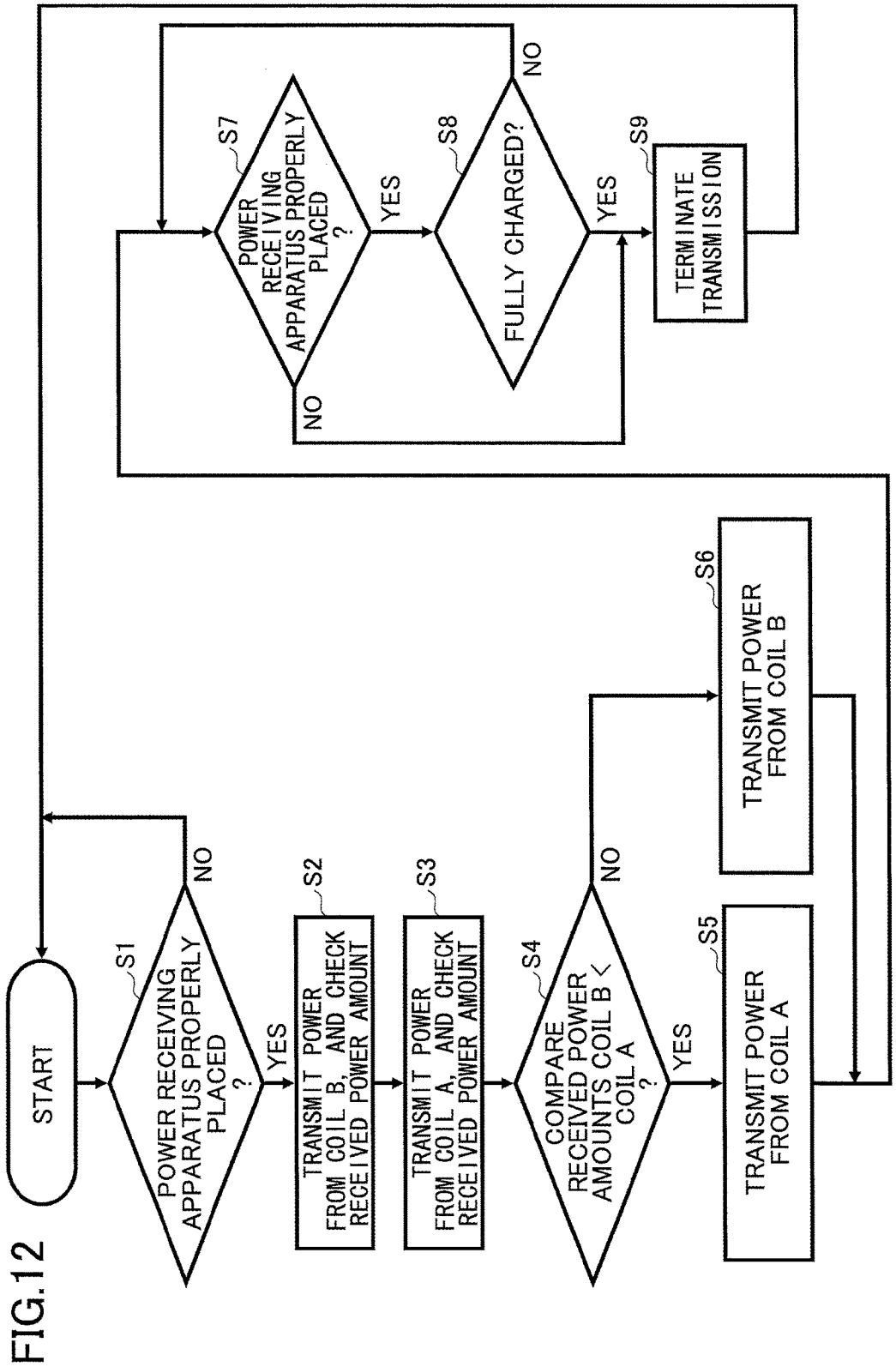
FIG. 12 is a flowchart illustrating an example of the operation of the power transmission system illustrated in FIG. 11.

FIG. 12 is a flowchart illustrating an example of the operation of the power transmission system illustrated in FIG. 11. In step S1, a check is made as to whether the power receiver 51 is placed within the range in which power transmitted from the power transmitter 50 can be received. For example, a manual switch operation or the like on the power transmitter 50 may be utilized to inform the power transmitter 50 that the power receiver 51 is placed within the range where transmitted power can be received. Alternatively, wireless communication through Bluetooth (registered trademark) or the like may be conducted between the power receiver 51 and the power transmitter 50 to detect the event that the power receiver 51 is placed within the transmitted power receivable range. The check in step S1 is repeated until the detection of the event that the power receiver 51 is placed within the transmitted power receivable range. When the event that the power receiver 51 is placed within the transmitted power receivable range is detected (YES in step S1), the procedure proceeds to step S2. In step S2, power is transmitted from a coil B (e.g., the resonance coil 13-1 of FIG. 2) to the power receiver 51, which then detects the amount of received power, and, then, the control unit 65 of the power transmitter 50 checks the amount of received power through wireless data communication. In step S3, power is transmitted from a coil A (e.g., the resonance coil 13-2 of FIG. 2) to the power receiver 51, which then detects the amount of received power, and, then, the control unit 65 of the power transmitter 50 checks the amount of received power through wireless data communication.

In step S4, the amounts of received powers are compared with each other to check whether the amount of received power in the case of the coil A being used is larger than the amount of received power in the case of the coil B being used. In the case of the check result in step S4 being YES, the coil A (e.g., the resonance coil 13-2 of FIG. 2) is selected to transmit power from the coil A to the power receiver 51. In the case of the check result in step S4 being NO, the coil B (e.g., the resonance coil 13-1 of FIG. 2) is selected to transmit power from the coil B to the power receiver 51.

In step S7, a check is made as to whether the power receiver 51 is situated within the range in which power transmitted from the power transmitter 50 can be received. In the case of the power receiver 51 being situated within the range in which power transmitted from the power transmitter 50 can be received (YES in step S7), a check is made in step S8 as to whether the battery is fully charged. In the case of the battery being not fully charged (NO in step S8), the procedure goes back to step S7 and repeats the step.

In the case of the power receiver 51 being not situated within the range in which power transmitted from the power transmitter 50 can be received (NO in step S7), or in the case of the battery being fully charged (YES in step S8), power transmission from the power transmitter 50 is terminated in step S9.

Figure 13:
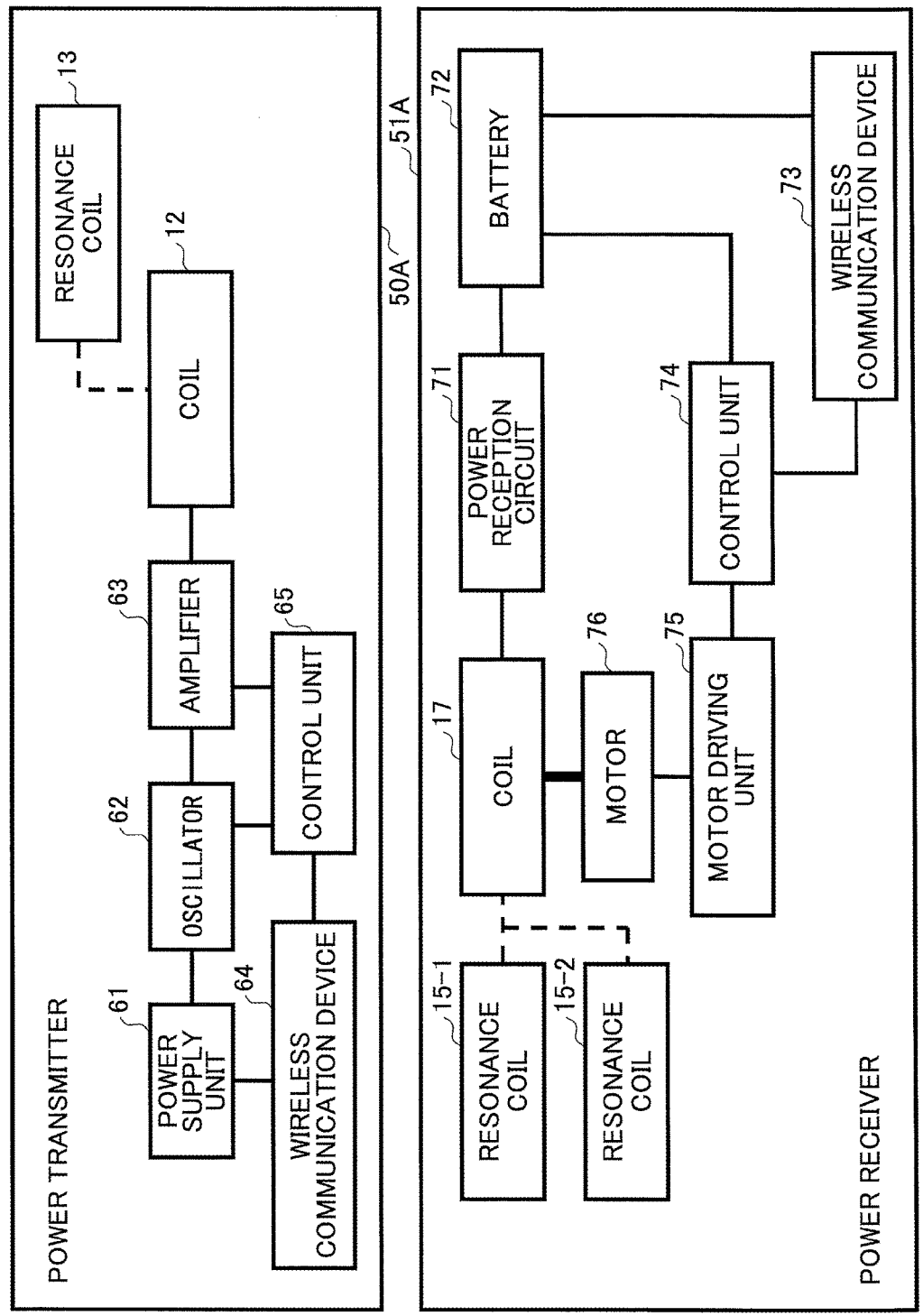
FIG. 13 is a block diagram illustrating an example of the configuration of a power transmitter and a power receiver of a power transmission system in which a plurality of resonance coils are provided on the power reception side.

FIG. 13 is a block diagram illustrating an example of the configuration of a power transmitter and a power receiver of a power transmission system in which a plurality of resonance coils are provided on the power reception side. The power transmission system illustrated in FIG. 11 includes a power transmitter 50A and a power receiver 51A. The power transmitter 50 A includes the coil 12, the resonance coil 13, the power supply unit 61, the oscillator 62, the amplifier 63, the wireless communication device 64, and the control unit 65. The power receiver 51A includes the resonance coils 15-1 and 15-2, the coil 17, the power reception circuit 71, the battery 72, the wireless communication device 73, the control unit 74, a motor driving unit 75, and a motor 76. In FIG. 13, the same or corresponding elements as those of FIG. 11 are referred to by the same or corresponding numerals, and a description thereof will be omitted as appropriate.

Unlike the configuration of the power transmission system illustrated in FIG. 11, the power transmission system illustrated in FIG. 13 has a plurality of resonance coils on the power reception side. As a result of this, the motor driving unit 75 and the motor 76 are provided in the power receiver 51A. The power transmitter 50A has no motor driving unit and no motor. In the example illustrated in FIG. 13, the angular position of the coil 17 is adjusted by the motor 76 that is driven by the motor driving unit 75. The positions of the resonance coils 15-1 and 15-2 may be fixed. This angular adjustment causes the axial direction of the coil 17 to be aligned with the axial direction of one of the resonance coils 15-1 and 15-2 and also to be orthogonal to the axial direction of the remaining one of the resonance coils 15-1 and 15-2. Alternatively, provision may be made such that the angular positions of the resonance coils 15-1 and 15-2 are adjusted by the motor 76, with the position of the coil 17 being fixed. The control unit 74 controls the motor driving unit 75. The motor driving unit 75 and the motor 76 correspond to the position control apparatus 40 illustrated in FIG. 9.

The resonance coils 15-1 and 15-2 receive power from the resonance coil 13 of the power transmitter 50A, and then transmit the received power to the coil 17 through electromagnetic induction. The power reception circuit 71 receives alternating-current power from the coil 17 through wire connections, and converts the alternating-current power into direct-current power for provision to the battery 72. With this arrangement, the battery 72 is charged. The power reception circuit 71 detects the amount of received power, and informs the control unit 74 of the detected value of received power amount. The control unit 74 controls the motor driving unit 75 in response to the detected value of received power amount. Through this control, a suitable one of the resonance coils 15-1 and 15-2 is selected in response to the detected amount of received power. Namely, a suitable resonance coil is selected in response to the distance between the power transmitter 50A and the power receiver 51A.

Figure 14:
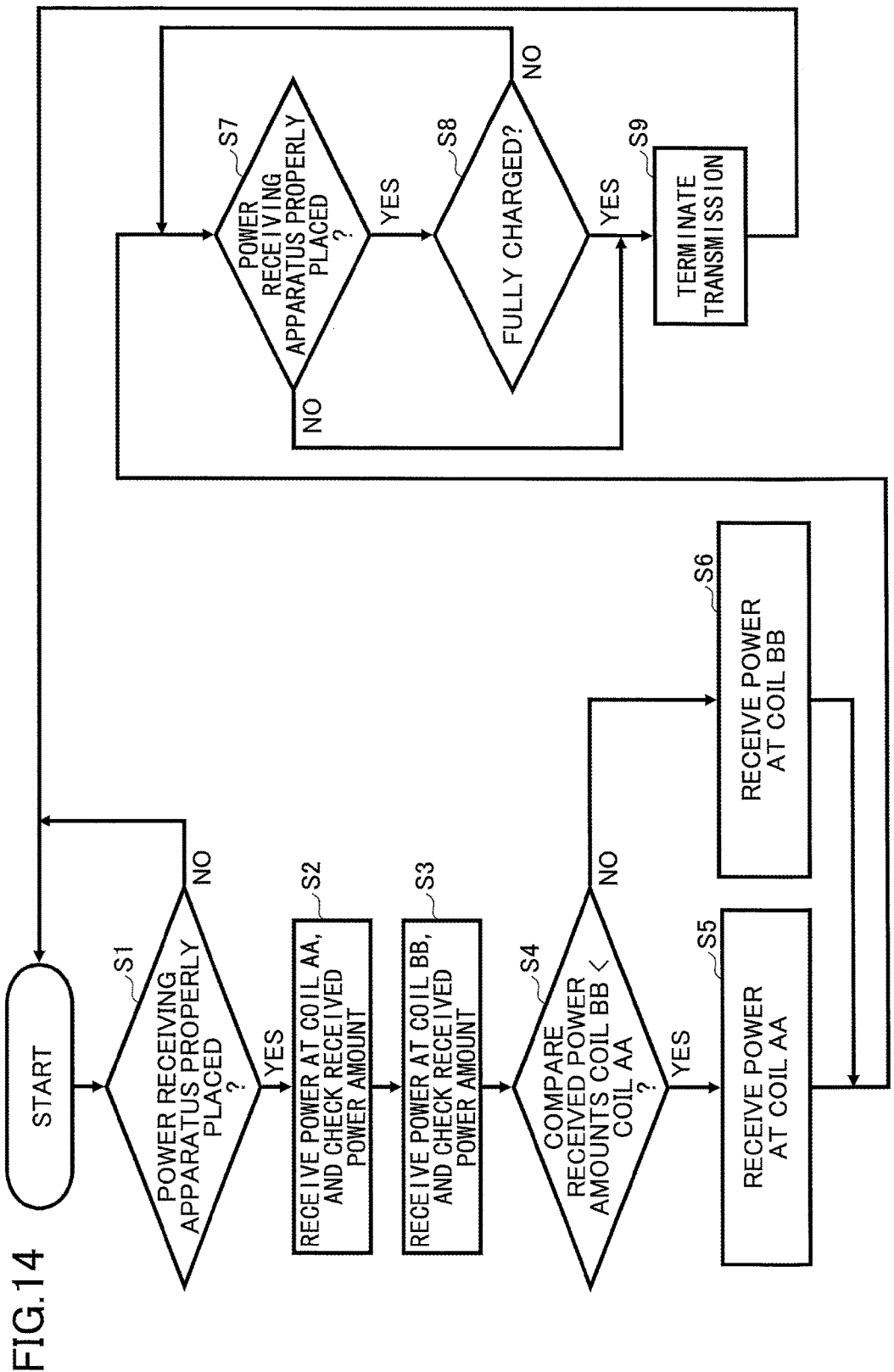
FIG. 14 is a flowchart illustrating an example of the operation of the power transmission system illustrated in FIG. 13.

FIG. 14 is a flowchart illustrating an example of the operation of the power transmission system illustrated in FIG. 13. In step S1, a check is made as to whether the power receiver 51A is placed within the range in which power transmitted from the power transmitter 50A can be received. For example, a manual switch operation or the like on the power transmitter 50A may be utilized to inform the power transmitter 50A that the power receiver 51A is placed within the range where transmitted power can be received. Alternatively, wireless communication through Bluetooth (registered trademark) or the like may be conducted between the power receiver 51A and the power transmitter 50A to detect the event that the power receiver 51A is placed within the transmitted power receivable range. The check in step S1 is repeated until the detection of the event that the power receiver 51A is placed within the transmitted power receivable range. When the event that the power receiver 51A is placed within the transmitted power receivable range is detected (YES in step S1), the procedure proceeds to step S2. In step S2, the power receiver 51A receives power at a coil AA (e.g., the resonance coil 15-2 of FIG. 9), and detects the amount of received power, followed by the control unit 74 of the power receiver 51A checking the amount of received power. In step S3, the power receiver 51A receives power at a coil BB (e.g., the resonance coil 15-1 of FIG. 9), and detects the amount of received power, followed by the control unit 74 of the power receiver 51A checking the amount of received power.

In step S4, the amounts of received powers are compared with each other to check whether the amount of received power in the case of the coil AA being used is larger than the amount of received power in the case of the coil AB being used. In the case of the check result in step S4 being YES, the coil AA (e.g., the resonance coil 15-2 of FIG. 9) is selected so that the power receiver 51A receives power by use of the coil AA. In the case of the check result in step S4 being NO, the coil BB (e.g., the resonance coil 15-1 of FIG. 9) is selected so that the power receiver 51A receives power by use of the coil BB.

In step S7, a check is made as to whether the power receiver 51A is situated within the range in which power transmitted from the power transmitter 50A can be received. In the case of the power receiver 51A being situated within the range in which power transmitted from the power transmitter 50A can be received (YES in step S7), a check is made in step S8 as to whether the battery is fully charged. In the case of the battery being not fully charged (NO in step S8), the procedure goes back to step S7 and repeats the step.

In the case of the power receiver 51A being not situated within the range in which power transmitted from the power transmitter 50A can be received (NO in step S7), or in the case of the battery being fully charged (YES in step S8), power transmission from the power transmitter 50A is terminated in step S9.

Further, the present invention is not limited to these embodiments, but various variations and modifications may be made without departing from the scope of the present invention. For example, the power receiver may include only a resonance coil in one example, and the power transmitter may include only a resonance coil in another example.

According to one embodiment, a power transmitting apparatus, a power transmission system, or a power transmission method is provided whose power transmission efficiency does not degrade in response to a change in the distance between the transmission side and the reception side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A power transmitting apparatus, comprising:
a power transmission or reception circuit;
a first coil connected to the power transmission or reception circuit through wires;
a plurality of resonance coils having respective, different diameters one of which is selectively coupled to the first coil through electromagnetic induction; and
a position control apparatus configured to control the positions of the resonance coils,
wherein the position control apparatus is configured to selectively align an axial direction of one of the resonance coils with an axial direction of the first coil and is configured to place an axial direction of each of one or more resonance coils other than the noted one of the resonance coils in a direction perpendicular to the axial direction of the first coil.

2. The power transmitting apparatus as claimed in claim 1, wherein each of the first coil and the resonance coils is a planar coil, and the position control apparatus is configured to selectively place the noted one of the resonance coils in a plane in which the first coil is disposed, and to place the one or more resonance coils other than the noted one of the resonance coils in a plane perpendicular to the plane in which the first coil is disposed.

3. The power transmitting apparatus as claimed in claim 1, wherein each of the first coil and the resonance coils is a planar coil, which is rotated around a common rotation axis by the position control apparatus for positional control.

4. A power transmission system, comprising:
a power transmitting apparatus; and a power receiving apparatus configured to receive power from the power transmitting apparatus via magnetic resonance, wherein at least one of the power transmitting apparatus and the power receiving apparatus includes:

a power transmission or reception circuit;

a first coil connected to the power transmission or reception circuit through wires;

a plurality of resonance coils having respective, different diameters one of which is selectively coupled to the first coil through electromagnetic induction; and a position control apparatus configured to control the positions of the resonance coils, wherein the position control apparatus is configured to selectively align an axial direction of one of the resonance coils with an axial direction of the first coil and is configured to place an axial direction of each of one or more resonance coils other than the noted one of the resonance coils in a direction perpendicular to the axial direction of the first coil.

5. The power transmission system as claimed in claim 4, wherein the power transmission or reception circuit detects an amount of received power, and the noted one of the resonance coils is selected from the plurality of resonance coils in response to the detected amount of received power.

6. The power transmission system as claimed in claim 4, wherein the power transmitting apparatus and the power receiving apparatus include respective wireless communication apparatuses for communication with each other, and data indicative of the detected amount of received power is transmitted through the wireless communication apparatuses from the power receiving apparatus to the power transmitting apparatus.

7. The power transmission system as claimed in claim 4, wherein each of the first coil and the resonance coils is a planar coil, and the position control apparatus is configured to selectively place the noted one of the resonance coils in a plane in which the first coil is disposed, and to place the one or more resonance coils other than the noted one of the resonance coils in a plane perpendicular to the plane in which the first coil is disposed.

8. A power transmission method, comprising:

selecting one of a plurality of resonance coils having respective, different diameters;

aligning an axial direction of the selected one of the resonance coils with an axial direction of a first coil;

placing an axial direction of each of one or more resonance coils other than the selected one of the resonance coils in a direction perpendicular to the axial direction of the first coil;

supplying alternating-current power to the first coil through wire connections;

supplying alternating-current power from the first coil to the selected one of the resonance coils through electromagnetic induction; and transmitting power from the selected one of the resonance coils to a resonance coil on a receiver side through magnetic resonance.

* * * * *